United States Patent
Kuhara et al.

(10) Patent No.: US 6,913,401 B2
(45) Date of Patent: Jul. 5, 2005

(54) OPTICAL TRANSMITTER AND OPTICAL CONNECTOR

(75) Inventors: Yoshiki Kuhara, Osaka (JP); Naoyuki Yamabayashi, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 46 days.

(21) Appl. No.: 10/443,460

(22) Filed: May 21, 2003

(65) Prior Publication Data

US 2004/0022540 A1 Feb. 5, 2004

(30) Foreign Application Priority Data

Jun. 6, 2002 (JP) .................................. P2002-166172

(51) Int. Cl.⁷ .............................. G02B 6/42; G02B 6/34
(52) U.S. Cl. .............................. 385/89; 385/25; 385/37; 385/90
(58) Field of Search .......................... 385/25, 37, 48, 385/88–94; 398/200, 201

(56) References Cited

U.S. PATENT DOCUMENTS

| 5,175,783 | A  | * | 12/1992 | Tatoh ........................... 385/93 |
| 5,835,646 | A  | * | 11/1998 | Yoshimura et al. ........... 385/14 |
| 6,238,100 | B1 | * | 5/2001  | Sasaki et al. ................. 385/59 |
| 2001/0046352 | A1 | * | 11/2001 | Ohta et al. .................... 385/50 |

FOREIGN PATENT DOCUMENTS

WO    WO94-22187    9/1994

* cited by examiner

Primary Examiner—Akm Enayet Ullah
Assistant Examiner—Omar Rojas
(74) Attorney, Agent, or Firm—Fish & Richardson P.C.

(57) ABSTRACT

An optical transmitter comprises an optical transmission unit having a semiconductor optical amplifier, and an optical connector having a plurality of diffraction gratings. The plurality of diffraction gratings are arranged in parallel with each other and partly reflect respective wavelengths of light different from each other. The optical connector is connected to the optical transmission unit such that light from the semiconductor optical amplifier is incident on one of the plurality of diffraction gratings.

10 Claims, 5 Drawing Sheets

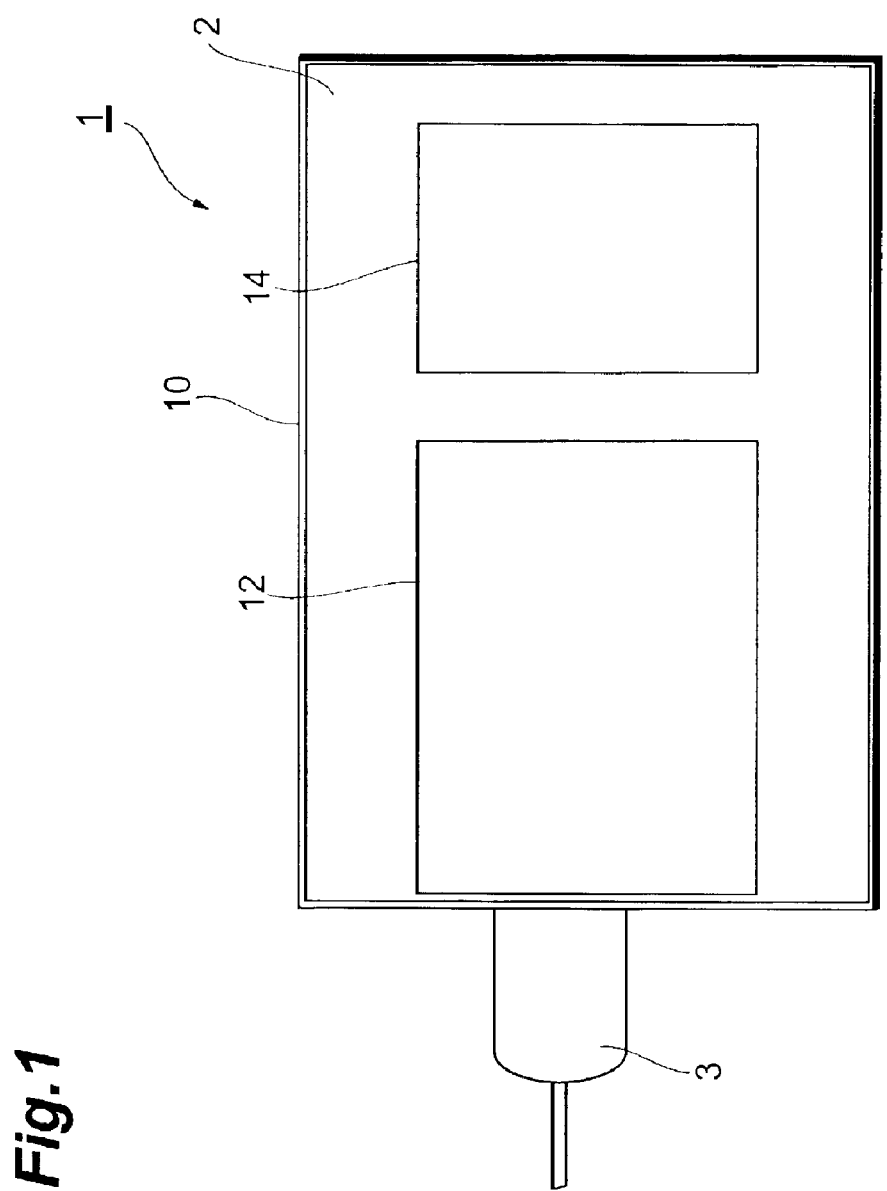

OPTICAL TRANSMITTER AND OPTICAL CONNECTOR

BACKGROUND OF THE INVENTION

1. Field of the Invention

The present invention relates to an optical transmitter and an optical connector.

2. Related Background Art

Conventionally known as an optical transmitter is a LD module shown in FIG. 5. In this LD module 100, a LD driver or the like applies a predetermined voltage to lead pins 101, whereby a laser diode 102 electrically connected to the lead pins 101 emits light. Light from the laser diode 102 is converged by a condenser lens 103, so as to be outputted from the LD module 100. However, the above-mentioned optical transmitter 100 can output only a predetermined single wavelength of light.

WO94/22187 publication discloses an optical transmitter which can output light having a wavelength other than the predetermined single wavelength. This optical transmitter comprises an optical transmission unit and an optical connector, whereas a diffraction grating is provided on the optical connector side. An optical resonator is constituted by a semiconductor optical amplifier of the optical transmission unit and the diffraction grating within the optical connector, so as to output a predetermined wavelength of light. As a consequence, this optical transmitter can change the wavelength of light by replacing the diffraction grating within the optical connector.

SUMMARY OF THE INVENTION

However, while the optical transmitter disclosed in WO94/22187 publication can change the wavelength of light outputted therefrom, the diffraction grating within the optical connector must be replaced in order to change the wavelength.

In view of the foregoing, it is an object of the present invention to provide an optical transmitter and an optical connector which can easily change wavelengths.

For achieving such an object, the present invention provides an optical transmitter comprising an optical transmission unit having a semiconductor optical amplifier, and an optical connector having a plurality of diffraction gratings, the plurality of diffraction gratings being arranged in parallel with each other and partly reflecting respective wavelengths of light different from each other, the optical connector being connected to the optical transmission unit such that light from the semiconductor optical amplifier is incident on one of the plurality of diffraction gratings.

In the present invention, the optical connector is connected to the optical transmission unit such that light from the semiconductor optical amplifier is incident on one of a plurality of diffraction gratings which partly reflect respective wavelengths of light different from each other. Therefore, varying the location to connect with the optical connector changes the diffraction grating on which light is incident. This also alters the wavelength of light to be outputted. Hence, the wavelength can easily be changed.

Preferably, in the present invention, the optical transmission unit comprises an optical waveguide for guiding toward the optical connector the light from the semiconductor optical amplifier.

Preferably, in this case, the optical waveguide is a $SiO_2$—$GeO_2$ type waveguide formed on a Si substrate or a polymer type waveguide formed on a Si substrate.

Preferably, in the present invention, the optical transmission unit is electrically connected with a lead frame and is molded with a resin.

Preferably, in the present invention, the plurality of diffraction gratings are provided with respective optical waveguides for introducing light from the optical transmission unit.

Preferably, in this case, the optical waveguides are $SiO_2$—$GeO_2$ type waveguides formed on a Si substrate or polymer type waveguides formed on a Si substrate.

Preferably, in the present invention, the optical waveguides are connected to each other at a position on the optical output side of a position where the plurality of diffraction gratings are disposed. In this case, the number of optical fibers and the like necessary for outputting light can become smaller than that in the case where optical waveguides are provided individually while light is outputted from optical fibers and the like whose number corresponds to that of the optical waveguides.

Preferably, in the present invention, the optical transmission unit has a plurality of guide grooves, the optical connector has a guide pin, and the optical connector connects with the optical transmission unit such that light from the semiconductor optical amplifier is incident on one of the plurality of diffraction gratings when the guide pin engages one of the plurality of guide grooves.

Preferably, in the present invention, the optical transmission unit and the optical connector are in physical contact with each other so as to be optically coupled to each other. In this case, light outputted from the optical transmission unit is directly fed into the optical connector. This can make optical loss lower than that yielded by way of a member for connecting the optical transmission unit and the optical connector to each other.

The present invention provides an optical connector comprising a plurality of diffraction gratings, the plurality of diffraction gratings being arranged in parallel with each other and partly reflecting respective wavelengths of light different from each other. When one of the plurality of diffraction gratings is chosen for receiving light from the semiconductor optical amplifier, a predetermined wavelength of light is outputted in this aspect of the present invention. When another diffraction grating is selected, another predetermined wavelength of light is outputted. Thus, wavelengths can easily be changed.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 1 is a view for explaining the configuration of an optical transmitter in accordance with an embodiment;

DESCRIPTION OF THE PREFERRED EMBODIMENTS

Figure 2A:
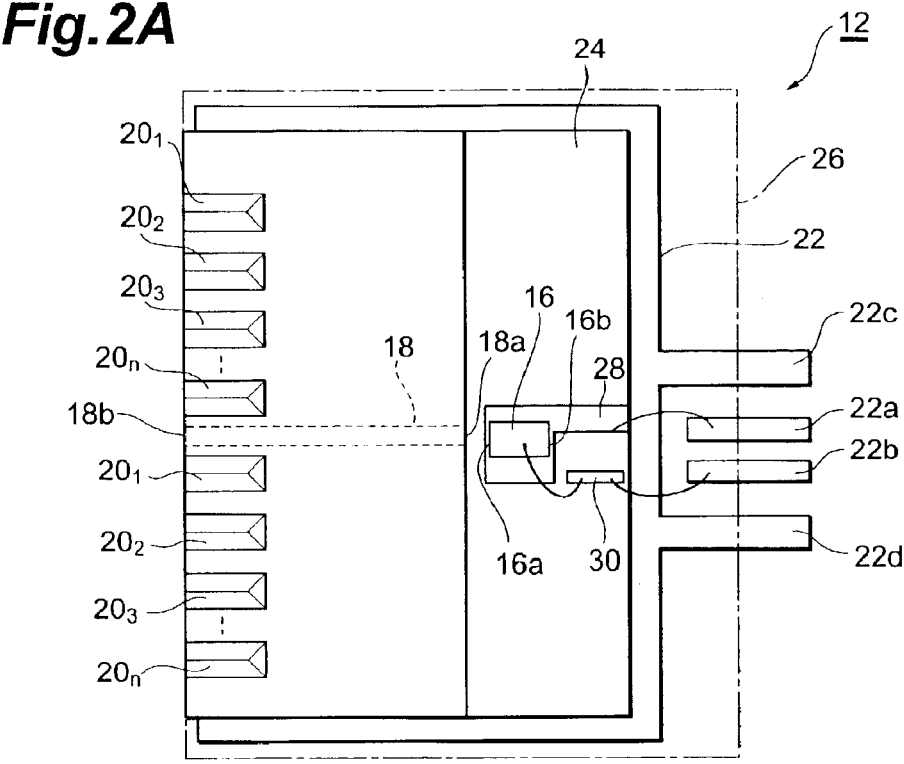
FIG. 2A is a plan view showing an optical output section included in the optical transmitter in accordance with the embodiment.

In the following, a preferred embodiment of the optical transmitter in accordance with the present invention will be explained in detail with reference to the drawings. In the explanation of the drawings, constituents identical or equivalent to each other will be referred to with numerals identical to each other without repeating their overlapping descriptions.

First, with reference to FIG. 1, the optical transmitter in accordance with this embodiment will be explained. FIG. 1 is a view for explaining the configuration of the optical transmitter in accordance with the embodiment of the present invention. The optical transmitter 1 comprises an optical transmission unit 2 and an optical connector 3. As shown in FIG. 1, the optical transmission unit 2 has, within a housing 10, an optical output section 12 for emitting and outputting light and a driving section 14 for driving the optical output section 12 as required, so as to cause the output section 12 to output light. The optical connector 3 is connected to the optical transmission unit 2.

Figure 2B:
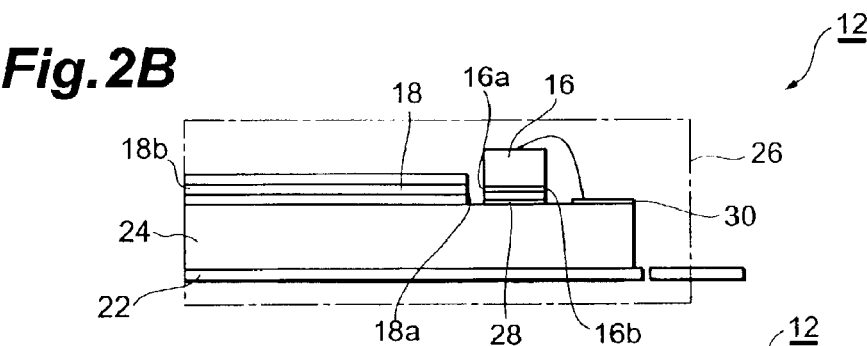
FIG. 2B is a side view showing the optical output section included in the optical transmitter in accordance with the embodiment.
Figure 2C:
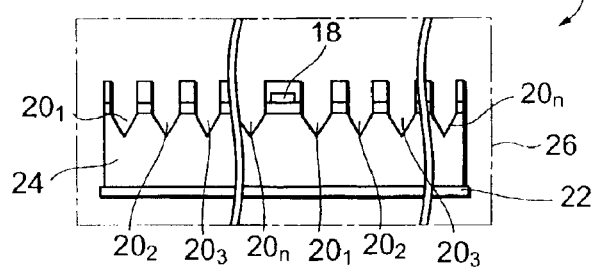
FIG. 2C is a front view showing the optical output section included in the optical transmitter in accordance with the embodiment.

The optical transmission unit 2 in the optical transmitter 1 will now be explained with reference to FIGS. 2A to 2C. FIG. 2A is a plan view showing the optical output section included in the optical transmitter in accordance with the embodiment. FIG. 2B is a side view showing the optical output section included in the optical transmitter in accordance with the embodiment. FIG. 2C is a front view showing the optical output section included in the optical transmitter in accordance with the embodiment.

As shown in FIGS. 2A to 2C, the optical output section 12 comprises a semiconductor optical amplifier (SOA) 16; an optical waveguide 18; a plurality of guide grooves $20_1$ to $20_n$; a lead frame 22 having lead terminals 22a, 22b, 22c, 22d; and a Si substrate 24. The semiconductor optical amplifier 16, the optical waveguide 18, the lead frame 22, and the Si substrate 24 are molded with an epoxy resin 26.

The semiconductor optical amplifier 16, an example of which is a semiconductor optical amplifier chip having a double heterostructure of InGaAsP/InP, is mounted on a first electrode part 28 disposed on the Si substrate 24. The first electrode part 28 is wire-bonded to the lead terminal 22a extending to the outside of the resin 26. The semiconductor optical amplifier 16 is wire-bonded to a second electrode part 30, which is wire-bonded to the lead terminal 22b extending to the outside of the resin 26. As a consequence, a driving current is applied to the semiconductor optical amplifier 16 by way of the lead terminals 22a, 22b and bonding wires. The lead terminals 22c, 22d are used as earth (ground) terminals.

The semiconductor optical amplifier 16 has one end face acting as a light exit surface 16a, and the other end face working as a light-reflecting surface 16b. The light-reflecting surface 16b is coated, so as to yield a reflectance of 85% to 100%. Therefore, the light emitted by the semiconductor optical amplifier 16 is outputted from the light exit surface 16a.

The optical waveguide 18 comprises a cladding layer having a thickness of about 10 $\mu$m, a core of about 5 to 6 $\mu$m square, and a cladding layer having a thickness of about 10 $\mu$m which are laminated in this order on the Si substrate 24. The optical waveguide 18 is a $SiO_2$—$GeO_2$ type waveguide or polymer type waveguide, for example. The optical waveguide 18 is disposed such that its leading end face 18a opposes the light exit surface 16a of the semiconductor optical amplifier 16. As a consequence, the light emitted from the semiconductor optical amplifier 16 is introduced into the optical waveguide 18. On the other hand, the trailing end face 18b opposite from the leading end face 18a of the optical waveguide 18 is exposed from the resin 26. The light is outputted from the trailing end face 18b toward the optical connector 3.

The plurality of guide grooves $20_1$ to $20_n$ are formed by etching the Si substrate 24. Guide pins, which will be explained later, are adapted to engage the guide grooves $20_1$ to $20_n$.

Figure 3A:
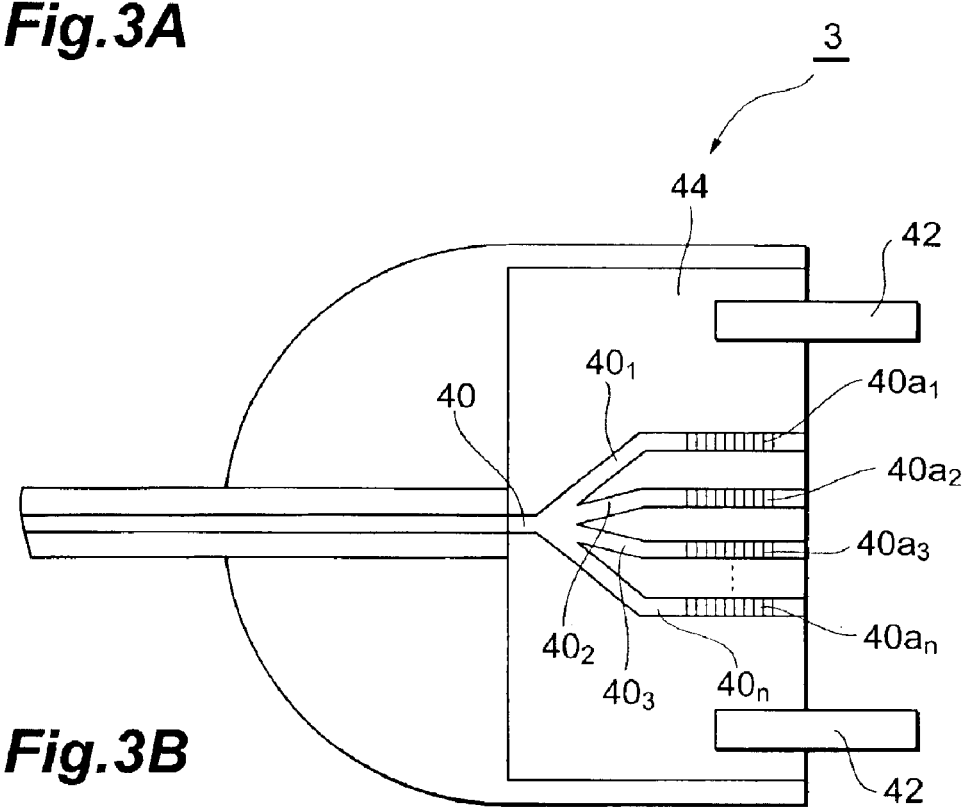
FIG. 3A is a view for explaining the configuration of an optical connector included in the optical transmitter in accordance with the embodiment.
Figure 3B:
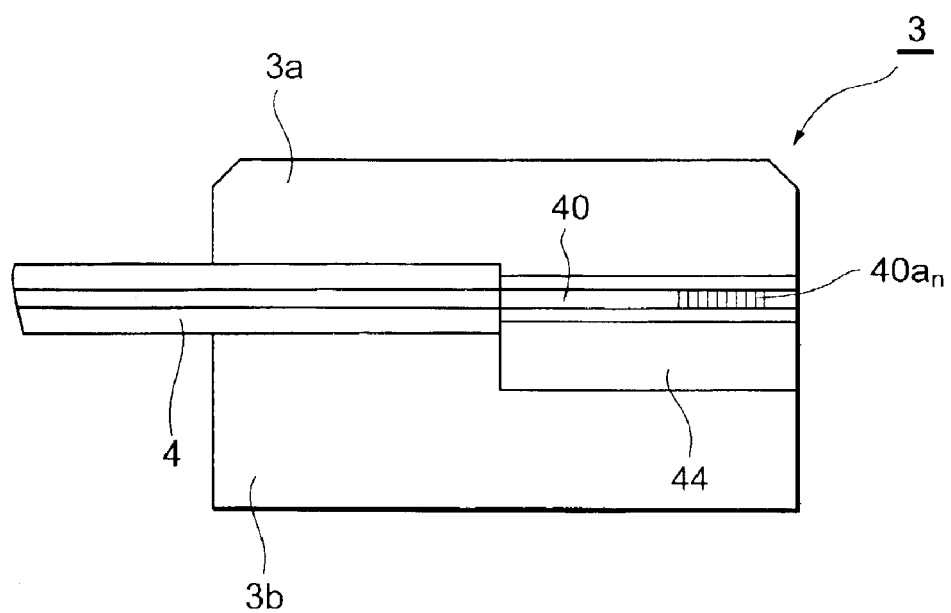
FIG. 3B is a view for explaining a cross-sectional structure of the optical connector included in the optical transmitter in accordance with the embodiment.

The optical connector 3 of the optical transmitter 1 will now be explained with reference to FIGS. 3A and 3B. FIG. 3A is a view for explaining the configuration of the optical connector included in the optical transmitter in accordance with the embodiment, whereas FIG. 3B is a view for explaining a cross-sectional structure of this optical connector.

The optical connector 3 comprises a first connector member 3a and a second connector member 3b, which hold an optical fiber 4 therebetween. The optical connector 3 further comprises an optical waveguide 40 provided with a plurality of Bragg diffraction gratings $40a_1$ to $40a_n$ in parallel, and guide pins 42 for connecting the optical connector 3 to the optical output section 12 of the optical transmission unit 2.

The optical waveguide 40 is laminated on a Si substrate 44 as with the optical waveguide 18 of the optical transmission, and introduces the light outputted from the optical transmission unit 2. The optical waveguide 40 is a $SiO_2$—$GeO_2$ type waveguide or polymer type waveguide, for example. The optical waveguide 40 comprises branched optical waveguides $40_1$ to $40_n$ disposed in parallel. The branched optical waveguides $40_1$ to $40_n$ have the respective Bragg diffraction gratings $40a_1$ to $40a_n$. The branched optical waveguides $40_1$ to $40_n$ are connected to each other at a position on the optical output side of the position where the Bragg diffraction gratings $40a_1$ to $40a_n$ are disposed.

The Bragg diffraction gratings $40a_1$ to $40a_n$ constitute respective resonators with the light-reflecting surface 16b of the semiconductor optical amplifier 16. The Bragg diffraction gratings $40a_1$ to $40a_n$ have respective grating intervals different from each other. As a consequence, the Bragg diffraction gratings $40a_1$ to $40a_n$ partly reflect respective wavelengths of light different from each other.

The guide pins 42 are inserted into and engage any of the plurality of guide grooves $20_1$ to $20_n$. Thus, the optical transmission unit 2 and the optical connector 3 are connected to each other.

Figure 4:
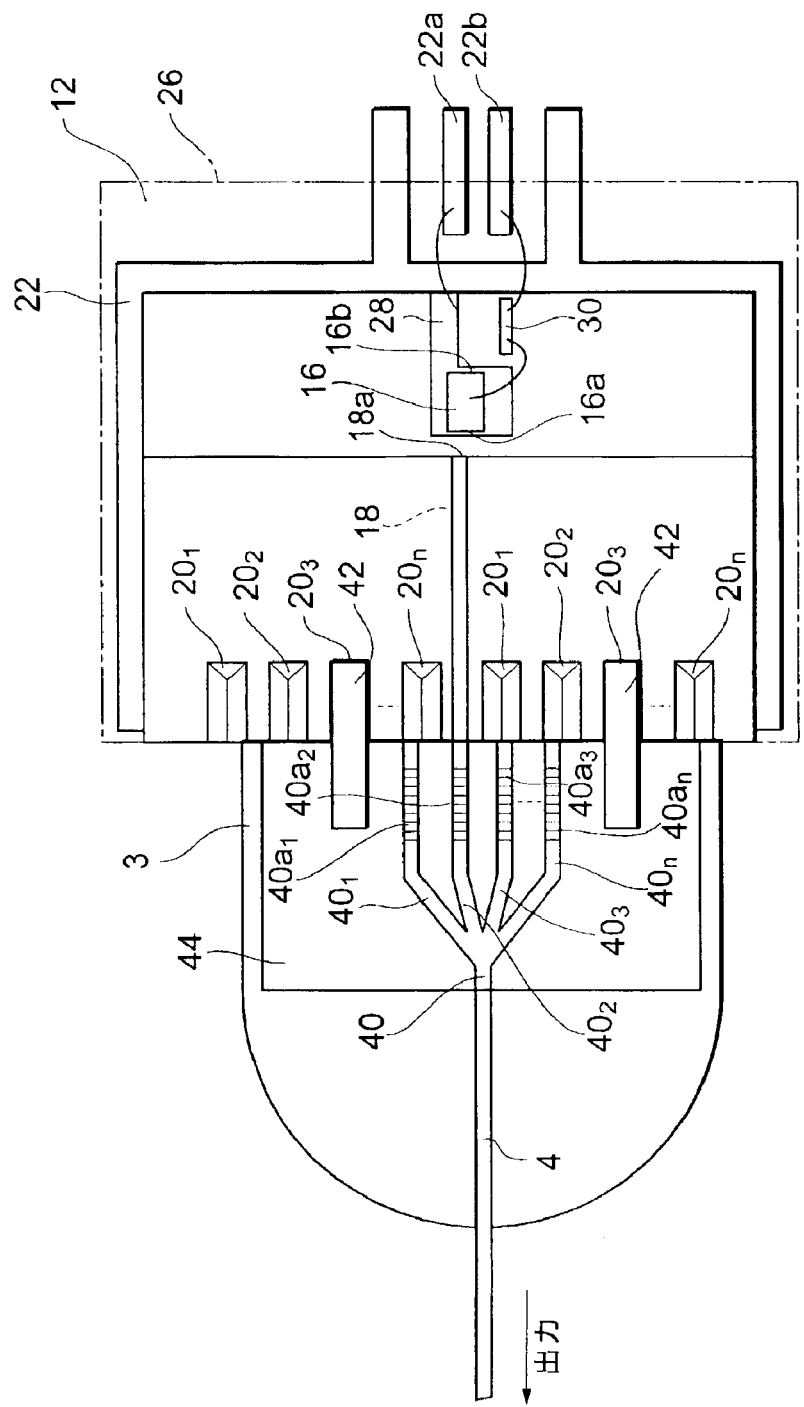
FIG. 4 is a view showing a state where the optical output section and optical connector in the optical transmitter in accordance with the embodiment are connected to each other.
Figure 5:
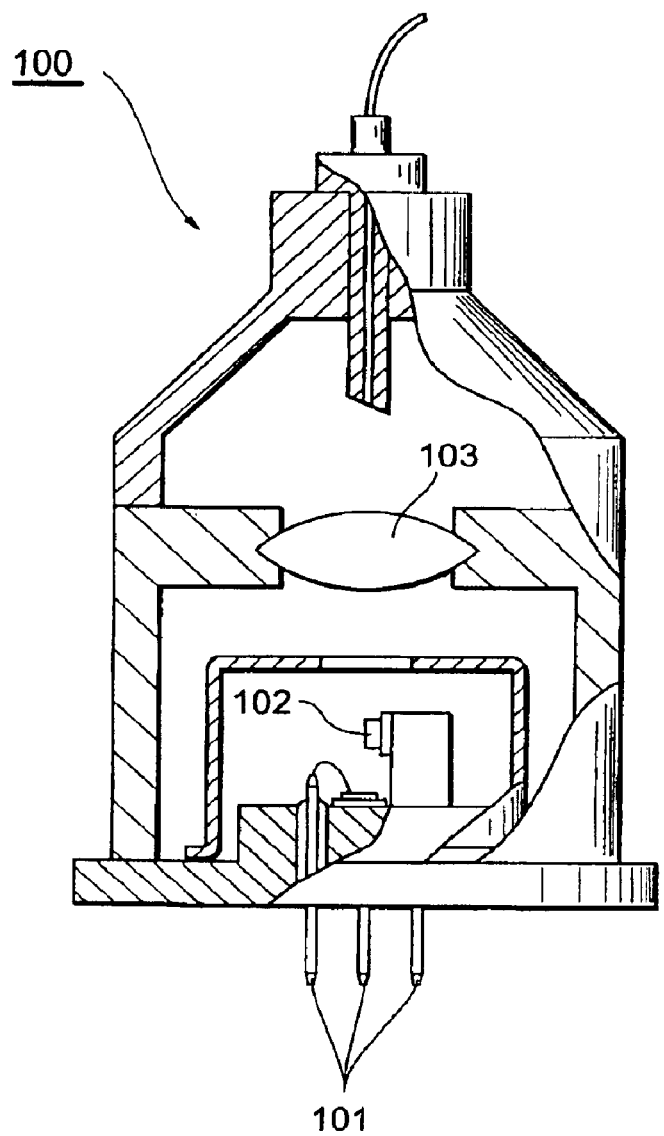
FIG. 5 is a schematic view showing an example of LD module within a conventional optical transmitter.

FIG. 4 is a view showing a state where the optical output section and optical connector in the optical transmitter in accordance with the embodiment are connected to each other. As shown in FIG. 4, the guide pins 42 are inserted into the guide grooves $20_3$, whereby the optical output section 12 (the optical transmission unit 2) and the optical connector 3 are connected to each other while in physical contact with each other. At this time, the optical waveguide 18 of the optical output section 12 (the optical transmission unit 2) is optically coupled to the branched optical waveguide $40_2$ but not to the branched optical waveguides $40_1$ to $40_n$ other than the branched optical waveguide $40_2$. As a consequence, the light from the semiconductor optical amplifier 16 is incident on the Bragg diffraction grating $40a_2$. A resonator is formed between the Bragg diffraction grating $40a_2$ and the light-reflecting surface 16b of the semiconductor optical amplifier 16, whereby laser oscillation occurs at a wavelength determined by the Bragg diffraction grating $40a_2$, and thus generated light is partly sent to the optical output side.

In the case where the guide pins 42 are inserted in the guide grooves $20_1$, the optical waveguide 18 of the optical output section 12 (the optical transmission unit 2) is optically coupled to the branched optical waveguide $40_n$ but not to the other branched optical waveguides $40_1$ to $40_{n-1}$. As a consequence, the light from the semiconductor optical amplifier 16 is incident on the Bragg diffraction grating $40a_n$. Thus, the guide grooves $20_1$ to $20_n$ in which the guide pins 42 are inserted determine the Bragg diffraction gratings $40a_1$ to $40a_n$ on which the light from the semiconductor optical amplifier 16 is incident.

Operations of the optical transmitter 1 will now be explained. First, the driving section 14 applies a driving current to the semiconductor optical amplifier 16. As a consequence, the semiconductor optical amplifier 16 emits light. This light does not exit from the light-reflecting surface 16b having a high reflectance but from the light exit surface 16a.

The light emitted from the light exit surface 16a is incident on and guided through the optical waveguide 18, so as to be outputted from the optical output section 12 (optical transmission unit 2). The light outputted from the optical output section 12 is introduced into any of the branched optical waveguides $40_1$ to $40_n$. Here, the branched optical waveguides $40_1$ to $40_n$ into which light is introduced are determined by the guide grooves $20_1$ to $20_n$ into which the guide pins 42 are inserted.

The light introduced into any of the branched optical waveguides $40_1$ to $40_n$ is reflected by the Bragg diffraction grating $40a_1$ to $40a_n$ provided therein. Thus reflected light returns to the semiconductor optical amplifier 16, and is reflected by the light-reflecting surface 16b. As this reflection is repeated, the light is amplified, so that laser oscillation occurs at a specific wavelength determined by the reflection characteristic of the Bragg diffraction grating $40a_1$ to $40a_n$, and thus generated light is partly outputted. The plurality of Bragg diffraction gratings $40a_1$ to $40a_n$ are set to respective grating intervals different from each other. The resulting laser light has a predetermined wavelength determined by the grating interval of the Bragg diffraction grating $40a_1$ to $40a_n$ partly reflecting the specific wavelength. The transmitted part of light is outputted from the optical transmitter 1.

As in the foregoing, the optical connector 3 is connected to the optical transmission unit 2 such that light from the semiconductor optical amplifier 16 is incident on one of a plurality of Bragg diffraction gratings $40a_1$ to $40a_n$ which partly reflect respective wavelengths of light different from each other in the optical transmitter 1 in accordance with the embodiment, where by the Bragg diffraction grating $40a_1$ to $40a_n$ on which light is incident changes when the location to connect with the optical connector 3 varies. This alters the wavelength of light to be outputted. Thus, wavelengths can easily be changed.

Also, in the optical transmitter 1 in accordance with this embodiment, the number of optical fibers 4 required for outputting light can be made smaller than that in the case where optical waveguides are provided individually while light is outputted from optical fibers 4 whose number corresponds to that of individually provided optical waveguides.

In the optical transmitter 1 in accordance with the embodiment, light outputted from the optical transmission unit 2 is directly fed into the optical connector 3. As a consequence, optical loss can be made lower than that yielded by way of a member for connecting the optical transmission unit 2 and the optical connector 3 to each other.

The optical connector 3 in accordance with the embodiment chooses one of a plurality of Bragg diffraction gratings $40a_1$ to $40a_n$ for receiving the light from the semiconductor optical amplifier 16, thereby outputting a predetermined wavelength of light. When another Bragg diffraction grating $40a_1$ to $40a_n$ is selected, another predetermined wavelength of light is outputted. Thus, wavelengths can easily be changed.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical transmitter comprising:
    an optical transmission unit having a semiconductor optical amplifier; and
    an optical connector having a plurality of diffraction gratings and at least one guide pin,
    said plurality of diffraction gratings being arranged in parallel with each other and partly reflecting respective wavelengths of light different from each other,
    said optical transmission unit further having an optical waveguide to guide light from said semiconductor optical amplifier toward said optical connector, said optical transmission unit further having a plurality of guide grooves,
    said optical connector being selectively connected to said optical transmission unit such that light from said semiconductor optical amplifier is incident on a selected one of said plurality of diffraction gratings when said guide pin engages a selected one of said plurality of guide grooves.

2. An optical transmitter according to claim 1, wherein said optical waveguide is a $SiO_2$—$GeO_2$ type waveguide formed on a Si substrate.

3. An optical transmitter according to claim 1, wherein said optical waveguide is a polymer type waveguide formed on a Si substrate.

4. An optical transmitter according to claim 1, wherein said optical transmission unit is electrically connected with a lead frame and is molded with a resin.

5. An optical transmitter according to claim 1, wherein said plurality of diffraction gratings are provided with respective optical waveguides for introducing light from said optical transmission unit.

6. An optical transmitter according to claim 5, wherein said optical waveguides are $SiO_2$—$GeO_2$ type waveguides formed on a Si substrate.

7. An optical transmitter according to claim 5, wherein said optical waveguides are polymer type waveguides formed on a Si substrate.

8. An optical transmitter according to claim 5, wherein said optical waveguides are connected to each other at a posterior side of said plurality of diffraction gratings with respect to a light-guiding direction.

9. An optical transmitter according to claim 1, wherein said optical transmission unit and said optical connector are in physical contact with each other so as to be optically coupled to each other.

10. An optical connector comprising a plurality of diffraction gratings, said plurality of diffraction gratings being arranged in parallel with each other and partly reflecting respective wavelengths of light different from each other, the optical connector further comprising one or more guide pins sized and positioned to selectively couple a selected one of the plurality of diffraction gratings to a light source.

* * * * *